United States Patent
Pehlert

(10) Patent No.: US 7,750,080 B2
(45) Date of Patent: Jul. 6, 2010

(54) BLENDS OF EPDM AND METALLOCENE PLASTOMERS FOR WIRE AND CABLE APPLICATIONS

(75) Inventor: George James Pehlert, Houston, TX (US)

(73) Assignee: ExxonMobil Chemical Patents Inc., Houston, TX (US)

(*) Notice: Subject to any disclaimer, the term of this patent is extended or adjusted under 35 U.S.C. 154(b) by 88 days.

(21) Appl. No.: 10/475,594

(22) PCT Filed: Mar. 20, 2002

(86) PCT No.: PCT/US02/08739

§ 371 (c)(1),
(2), (4) Date: Oct. 23, 2003

(87) PCT Pub. No.: WO02/085954

PCT Pub. Date: Oct. 31, 2002

(65) Prior Publication Data

US 2004/0118592 A1    Jun. 24, 2004

Related U.S. Application Data

(60) Provisional application No. 60/286,060, filed on Apr. 23, 2001.

(51) Int. Cl.
C08L 23/00 (2006.01)
C08L 23/04 (2006.01)
C08L 23/10 (2006.01)
C08L 9/00 (2006.01)
C08K 5/00 (2006.01)

(52) U.S. Cl. ........................ 525/191; 525/232; 525/240; 524/515

(58) Field of Classification Search ................. 525/191, 525/232, 240; 524/515
See application file for complete search history.

(56) References Cited

U.S. PATENT DOCUMENTS

| | | | | |
|---|---|---|---|---|
| 5,674,613 | A | 10/1997 | Dharmarajan et al. | 428/378 |
| 5,681,897 | A | 10/1997 | Silvis et al. | 525/150 |
| 5,763,533 | A | 6/1998 | Dharmarajan et al. | 525/211 |
| 5,861,463 | A | 1/1999 | Sehanobish et al. | 525/240 |
| 5,952,427 | A | 9/1999 | Dharmarajan et al. | 525/211 |
| 6,150,467 | A * | 11/2000 | Dharmarajan et al. | 525/211 |
| 6,429,260 | B1 | 8/2002 | Plaver et al. | 525/98 |
| 6,528,597 | B2 * | 3/2003 | Loveday et al. | 526/113 |
| 6,646,056 | B2 | 11/2003 | Zhao et al. | 525/243 |
| 2005/0215737 | A1* | 9/2005 | Dharmarajan et al. | 526/170 |
| 2006/0088693 | A1* | 4/2006 | Pehlert et al. | 428/141 |

FOREIGN PATENT DOCUMENTS

| | | |
|---|---|---|
| EP | 0 543 663 | 6/1993 |
| WO | WO 93/04486 | 3/1993 |
| WO | WO 97/26297 | 7/1997 |
| WO | WO 98/56012 | 12/1998 |
| WO | WO 00/79543 | 12/2000 |

* cited by examiner

Primary Examiner—Nathan M Nutter

(57) ABSTRACT

Power cable coating compounds are disclosed, the coating compounds including an ethylene alpha-olefin diene elastomeric terpolymer, and an ethylene alpha-olefin copolymer having a Melt Index Ratio $I_{10}/I_2$ of at least 7 and/or a Melt Index Ratio $I_{21}/I_2$ of at least 20. In various embodiments, the ethylene alpha-olefin copolymer can be present in the coating compound in amounts up to 90 percent by weight, based on the weight of the ethylene alpha-olefin diene elastomeric terpolymer and the ethylene alpha-olefin copolymer. Also disclosed are electrical devices including extruded coating compounds, the extruded compounds having low surface roughness at high extrusion rates.

55 Claims, No Drawings

BLENDS OF EPDM AND METALLOCENE PLASTOMERS FOR WIRE AND CABLE APPLICATIONS

This application is the National Stage of International Application No. PCT/US02/08739, filed Mar. 20, 2002, which claims the benefit of U.S. Provisional Application No. 60/286,060, filed Apr. 23, 2001, the entire disclosure of which is hereby incorporated herein by reference.

1. FIELD OF THE INVENTION

The present invention is directed generally to coating compounds for electrical applications, and to electrical devices including such coating compounds. More particularly, the coating compounds include an ethylene alpha-olefin diene elastomeric terpolymer, and an ethylene alpha-olefin copolymer having a Melt Index Ratio $I_{10}/I_2$ of at least 7 and/or a Melt Index Ratio $I_{21}/I_2$ of at least 20, and to electrical devices including extruded coating compounds, the extruded compounds having low surface roughness at high extrusion rates.

2. BACKGROUND

A wide variety of polymeric materials have been utilized as electrical insulating materials for power cables and other electrical devices. Typical insulating compounds include elastomers such as ethylene, α-olefin, non-conjugated diene terpolymers (EPDM), along with fillers and various additives. These EPDM polymers can provide good insulating properties, but usually require relatively slow extrusion rates, because surface characteristics of the extrudate in a compound based on these elastomeric polymers will not be as smooth as desired if the extrusion rates are higher. U.S. Pat. No. 5,674,613 discloses that compounds containing ethylene propylene vinyl norbornene elastomers (EP(D)M-VNB) have enhanced cure characteristics, good electrical properties characterized by low power factor loss, enhanced extrusion rates and a smoother extrusion surface, compared to compounds containing commercial EPDM polymers such as those using ethylidine norbornene (ENB) or 1,4-hexadiene non-conjugated diene monomers. The enhanced extrusion characteristics are attributed to a high level of long chain branching. However the high level of branching also degrades the compound physical properties, notably elongation to break.

U.S. Pat. Nos. 5,763,533 and 5,952,427 disclose that the physical properties of EP(D)M-VNB polymers can be improved by combination with metallocene-catalyzed ethylene alpha-olefin copolymers. The amount of ethylene alpha-olefin copolymer that could be used is limited, however, by processability problems that occur at high ethylene alpha-olefin content.

It would be desirable to have a polymeric composition suitable for use in compounds for electrical applications, such as cable coating compounds, which exhibit good electrical and mechanical properties, while allowing higher levels of ethylene alpha-olefin incorporation, without sacrificing extrusion processability and extruded surface smoothness at relatively high (and thus economically advantageous) extrusion rates.

3. SUMMARY

It has been surprisingly found that power cable coating compounds can be prepared with very high levels of ethylene alpha-olefin copolymers blended with an ethylene alpha olefin diene terpolymer, while still maintaining excellent mechanical, electrical and processing characteristics. This surprising result is achieved at least in part by proper selection of the ethylene alpha-olefin copolymer.

In one aspect, the present invention is directed to a power cable coating compound, the coating compound including an ethylene alpha-olefin diene elastomeric terpolymer, and an ethylene alpha-olefin copolymer having a Melt Index Ratio $I_{10}/I_2$ of at least 7.

In another aspect, the ethylene alpha-olefin copolymer has a Melt Index Ratio $I_{21}/I_2$ of at least 20.

In various embodiments, the ethylene alpha-olefin copolymer is present in the coating compound in an amount of from 10 to 90 percent by weight, based on the weight of the ethylene alpha-olefin diene elastomeric terpolymer and the ethylene alpha-olefin copolymer, or in an amount greater than 30 percent by weight, based on the weight of the ethylene alpha-olefin diene elastomeric terpolymer and the ethylene alpha-olefin copolymer, or in an amount greater than 50 percent by weight, based on the weight of the ethylene alpha-olefin diene elastomeric terpolymer and the ethylene alpha-olefin copolymer.

In various embodiments, the ethylene alpha-olefin diene elastomeric terpolymer has one or more of: a branching index less than 0.5; from 50 to 90 mol % ethylene-derived units; from 0.1 to 1.5 mol % diene-derived units; and a ratio $M_w/M_n$ greater than 10.

In another embodiment, the present invention is directed to an electrically conductive device, the device including an electrically conductive portion, and an electrically insulating portion. The electrically insulating portion includes a coating compound, which can be any of the coating compounds described herein. Suitable devices include any device having electrically conductive or semi-conductive and electrically insulative portions. A preferred, non-limiting example of such a device is an electrical cable.

Extruded compounds according to the present invention have good processability characteristics at high extrusion rate, characterized by a low surface roughness factor as defined herein. Thus, in one aspect, the present invention provides an electrically conductive device including an extruded coating compound having an extrusion profile measured from a sample extruded at 100 rpm and 125° C., the extrusion profile having a plurality of positive and negative vertical deviations from a mean extrudate surface line, wherein the extruded compound has a surface roughness factor R of less than 20, where R is defined by $$R = Ra + 0.1Rt,$$

Ra is the mean absolute vertical deviation from the mean extrudate surface line, and Rt is the absolute vertical difference between the maximum positive vertical deviation from the mean extrudate surface line and the maximum negative vertical deviation from the mean extrudate surface line.

4. DETAILED DESCRIPTION

In one embodiment, the present invention is directed to a power cable coating compound including an ethylene alpha-olefin diene elastomeric terpolymer and an ethylene alpha-olefin copolymer. The ethylene alpha-olefin copolymer, as described below, has a Melt Index Ratio $I_{10}/I_2$ of at least 7.

As used herein, the term "power cable coating compound" or simply "compound" is used to mean a polymer component or components in combination with fillers, accelerants, curatives, extenders and other components commonly used in the art to form a material having the requisite processing, heat aging, electrical and other properties suitable for use as an insulative coating layer in an electrical cable. Power cable coating compounds are described in more detail below.

Ethylene Alpha-Olefin Terpolymer

Embodiments of the present invention include an ethylene alpha-olefin elastomer. The elastomer is a terpolymer of ethylene; an alpha olefin, such as propylene; and a non-conjugated diene. Non-conjugated dienes useful as co-monomers preferably are straight or branched chain hydrocarbon di-olefins or cycloalkenyl-substituted alkenes, having about 6 to about 15 carbon atoms, for example: (a) straight chain acyclic dienes, such as 1,4-hexadiene and 1,6-octadiene; (b) branched chain acyclic dienes, such as 5-methyl-1,4-hexadiene; 3,7-dimethyl-1,6-octadiene; and 3,7-dimethyl-1,7-octadiene; (c) single ring alicyclic dienes, such as 1,4-cyclohexadiene; 1,5-cyclo-octadiene and 1,7-cyclododecadiene; (d) multi-ring alicyclic fused and bridged ring dienes, such as tetrahydroindene; norbornadiene; methyl-tetrahydroindene; dicyclopentadiene (DCPD); bicyclo-(2.2.1)-hepta-2,5-diene; alkenyl, alkylidene, cycloalkenyl and cycloalkylidene norbornenes, such as 5-methylene-2-norbornene (MNB), 5-propenyl-2-norbornene, 5-isopropylidene-2-norbornene, 5-(4-cyclopentenyl)-2-norbornene, 5-cyclohexylidene-2-norbornene, and 5-vinyl-2-norbornene (VNB); (e) cycloalkenyl-substituted alkenes, such as vinyl cyclohexene, allyl cyclohexene, vinyl cyclooctene, 4-vinyl cyclohexene, allyl cyclodecene, and vinyl cyclododecene. Preferred non-conjugated dienes are 5-ethylidene-2-norbornene (ENB), 1,4-hexadiene, dicyclopentadiene (DCPD), norbornadiene, and 5-vinyl-2-norbornene (VNB), with VNB being most preferred. Note that throughout this application the terms "non-conjugated diene" and "diene" are used interchangeably.

The elastomer can contain ethylene-derived units in a range from a lower limit of 50, or 60, or 65, or 68 mole percent to an upper limit of 80 or 85 or 90 mole percent, based on the total moles of monomer-derived units in the polymer. The elastomer can contain alpha-olefin-derived units in a range from a lower limit of 10 or 15 or 20 mole percent to an upper limit of 32 or 35 or 40 or 50 mole percent, based on the total moles of monomer-derived units in the polymer. The elastomer can contain the non-conjugated diene-derived units in a range of from a lower limit of 0.1 or 0.16 mole percent to an upper limit of 0.4 or 1.5 or 5 mole percent, based on the total moles of monomer-derived units in the polymer. The elastomeric polymer can also be characterized by a Mooney viscosity (ML [1+4] 125° C.) of from 10 to 80, and a molecular weight distribution $M_{w,GPC,LALLS}/M_{n,GPC,DRI}$ ($M_w/M_n$) greater than 6.

As noted above, a preferred non-conjugated diene is vinyl norbornene. Although not wishing to be bound by theory, the Ziegler polymerization of the pendent double bond in vinyl norbornene (VNB) is believed to produce a highly branched ethylene, alpha-olefin, vinyl norbornene elastomeric polymer. This method of branching permits the production of ethylene, alpha-olefin, vinyl norbornene elastomeric polymers substantially free of gel which would normally be associated with cationically branched ethylene, alpha-olefin, vinyl norbornene elastomeric polymers containing, for instance, a less-preferred non-conjugated diene such as 5-ethylidene-2-norbornene or 1,4-hexadiene. The synthesis of substantially gel-free ethylene, alpha-olefin, vinyl norbornene elastomeric polymers containing vinyl norbornene is discussed in Japanese laid open patent applications JP S61-151758 and JP S62-210169.

In a particular embodiment, a procedure suitable for preparing ethylene alpha-olefin diene terpolymers is as follows. The catalysts used are VOCl$_3$ (vanadium oxytrichloride) or VCl$_4$ (vanadium tetrachloride) with the latter as the preferred catalyst. The co-catalyst is chosen from (i) ethyl aluminum sesqui chloride (SESQUI), (ii) diethyl aluminum chloride (DEAC), and (iii) equivalent mixture of diethyl aluminum chloride and triethyl aluminum (TEAL). As shown in U.S. Pat. No. 5,763,533 (FIG. 8), the choice of co-catalyst influences the composition distribution in the polymer. An elastomer with a broader composition distribution is expected to provide better tensile strength in a cable coating compound. The polymerization is carried out in a continuous stirred tank reactor at 20-65° C. at a residence time of 6-15 minutes and a pressure of 7 kg/cm$^2$. The concentration ratio of vanadium to alkyl is from 1 to 4 to 1 to 8. About 0.3 to 1.5 kg of polymer is produced per gram of catalyst fed to the reactor. The polymer concentration in the hexane solvent is in the range of 3-7% by weight. As reported in U.S. Pat. No. 5,763,533, the synthesis of ethylene, alpha-olefin, vinyl norbornene polymers was conducted both in a laboratory pilot unit (output about 4 kg/day), a large scale semi works unit (output 1T/day), and a commercial scale production unit (output 200,000 kg/day).

A discussion of catalysts suitable for polymerizing the elastomeric polymer or other catalysts and co-catalysts contemplated can be found in Japanese laid open patent applications JP S61-151758 and JP S62-210169.

The resulting polymers had the following molecular characteristics:

The intrinsic viscosity measured in decalin at 135° C. was in the range of 1 to 2 dL/g. The molecular weight distribution ($M_{w,LALLS}/M_{n,GPC/DRI}$) was greater than 10. The branching index was in the range of 0.1 to 0.3.

Metallocene catalysis to form the ethylene alpha-olefin diene terpolymer is also contemplated. Suitable metallocene compounds, activators, and processes are well known in the art and can be found in U.S. Pat. No. 5,763,533 and references cited therein.

For peroxide cure applications, ethylene, alpha-olefin, diene monomer elastomeric polymers wherein the diene monomer is vinyl norbornene require lower levels of peroxide to attain the same cure state, compared to analogous polymers wherein the diene monomer is ethylidene norbornene, at the same level of incorporated diene. Typically, 20 to 40% lower peroxide consumption can be realized using ethylene, alpha-olefin, vinyl norbornene. The efficiency of vinyl norbornene in providing high crosslink density with peroxide vulcanization also permits a reduction in the overall diene level to attain the same cure state as with ethylidene norbornene polymers, and results in enhanced heat aging performance. The unique combinations of improved processability, lower peroxide usage and enhanced heat aging are particular advantages provided by ethylene, alpha-olefin, vinyl norbornene terpolymers over less preferred terpolymers containing non-conjugated dienes such as ethylidene norbornene or 1-4, hexadiene.

Molecular weight distribution (MWD) is a measure of the range of molecular weights within a given polymer sample. It is well known that the breadth of the MWD can be characterized by the ratios of various molecular weight averages, such as the ratio of the weight average molecular weight to the number average molecular weight, Mw/Mn, or the ratio of the Z-average molecular weight to the weight average molecular weight, Mz/Mw.

Mz, Mw and Mn can be measured using gel permeation chromatography (GPC), also known as size exclusion chromatography (SEC). This technique utilizes an instrument containing columns packed with porous beads, an elution solvent, and detector in order to separate polymer molecules of different sizes. In a typical measurement, the GPC instrument used is a Waters chromatograph equipped with ultrastyro gel columns operated at 145° C. The elution solvent used is trichlorobenzene. The columns are calibrated using sixteen polystyrene standards of precisely known molecular weights. A correlation of polystyrene retention volume obtained from the standards, to the retention volume of the polymer tested yields the polymer molecular weight.

Average molecular weights M can be computed from the expression:

$$M = \frac{\sum_i N_i M_i^{n+1}}{\sum_i N_i M_i^n}$$

where $N_i$ is the number of molecules having a molecular weight $M_i$. When n=0, M is the number average molecular weight Mn. When n=1, M is the weight average molecular weight Mw. When n=2, M is the Z-average molecular weight Mz. The desired MWD function (e.g., Mw/Mn or Mz/Mw) is the ratio of the corresponding M values. Measurement of M and MWD is well known in the art and is discussed in more detail in, for example, Slade, P. E. Ed., *Polymer Molecular Weights Part II*, Marcel Dekker, Inc., NY, (1975) 287-368; Rodriguez, F., *Principles of Polymer Systems 3rd ed.*, Hemisphere Pub. Corp., NY, (1989) 155-160; U.S. Pat. No. 4,540,753; Verstrate et al., *Macromolecules*, vol. 21, (1988) 3360; and references cited therein The relative degree of branching in the ethylene, alpha-olefin, diene monomer terpolymer is determined using a branching index factor. Calculating the branching index factor requires a series of three laboratory measurements of polymer properties in solutions: (i) weight average molecular weight ($M_{w,LALLS}$) measured using a low angle laser light scattering (LALLS) technique; (ii) weight average molecular weight ($M_{w,DRI}$); and (iii) viscosity average molecular weight ($M_{v,DRI}$) using a differential refractive index detector (DRI); and (iv) intrinsic viscosity (IV) measured in decalin at 135° C.

The branching index (BI) is defined as:

$$BI = \frac{M_{v,br} M_{w,DRI}}{M_{w,LALLS} M_{v,DRI}} \quad (1)$$

where $M_{v,br} = k(IV)^{1/a}$, and 'a' is the Mark-Houwink constant (=0.759 for ethylene, alpha-olefin, diene monomer in decalin at 135° C.).

From equation (1), it follows that the branching index for a linear polymer is 1.0, and for branched polymers the extent of branching is defined relative to the linear polymer. Since at a constant $M_n$, $(Mw)_{branch} > (Mw)_{linear}$, BI for a branched polymers is less than 1.0, and a smaller BI value denotes a higher level of branching. It should be noted that this method indicates only the relative degree of branching and not a quantified amount of branching as would be determined using a direct measurement, such as by nuclear magnetic resonance (NMR). A detailed description of these measurements and calculations can be found in VerStrate, "Ethylene-Propylene Elastomers", *Encyclopedia of Polymer Science and Engineering*, 6, 2nd edition, (1986).

The ethylene alpha-olefin diene terpolymer can have a molecular weight distribution Mw/Mn of greater than 6, or alternatively greater than 10.

The ethylene alpha-olefin diene terpolymer can have a branching index less than 1.0, less than 0.9, less than 0.7, 0.5, less than 0.4, or less than 0.3, and greater than 0.05, or greater than 0.1.

Ethylene Alpha-Olefin Copolymer

Embodiments of the present invention also include an ethylene alpha-olefin copolymer. It has been surprisingly discovered that ethylene alpha-olefin copolymers can be used with ethylene alpha-olefin diene elastomers in cable coating compounds in much higher levels than previously thought practical due to processibility (melt fracture) problems at relatively high extrusion rates. In particular, it has been surprisingly found that, by selecting a specific type of ethylene-alpha olefin copolymer as described below, cable coating compounds can be formed having a wide range of ethylene alpha-olefin content, while still maintaining good electrical and processability properties.

Suitable ethylene alpha-olefins are metallocene-catalyzed copolymers of ethylene and an alpha-olefin comonomer, the alpha-olefin being a $C_3$-$C_{20}$ α-olefin and preferably a $C_3$-$C_{12}$ α-olefins. The α-olefin comonomer can be linear or branched, and two or more comonomers can be used, if desired. Examples of suitable alpha-olefin comonomers include propylene, linear $C_4$-$C_{12}$ α-olefins, and α-olefins having one or more $C_1$-$C_3$ alkyl branches. Specific examples include propylene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene, or 1-dodecene. Preferred comonomers include ethylene, 1-butene, 1-pentene, 3-methyl-1-butene, 1-hexene, 3-methyl-1-pentene, 4-methyl-1-pentene, 3,3-dimethyl-1-butene, 1-heptene, 1-hexene with a methyl substituent on any of $C_3$-$C_5$, 1-pentene with two methyl substituents in any stoichiometrically acceptable combination on $C_3$ or $C_4$, 3-ethyl-1-pentene, 1-octene, 1-pentene with a methyl substituent on any of $C_3$ or $C_4$, 1-hexene with two methyl substituents in any stoichiometrically acceptable combination on $C_3$-$C_5$, 1-pentene with three methyl substituents in any stoichiometrically acceptable combination on $C_3$ or $C_4$, 1-hexene with an ethyl substituent on $C_3$ or $C_4$, 1-pentene with an ethyl substituent on $C_3$ and a methyl substituent in a stoichiometrically acceptable position on $C_3$ or $C_4$, 1-decene, 1-nonene, 1-nonene with a methyl substituent on any of $C_3$-$C_9$, 1-octene with two methyl substituents in any stoichiometrically acceptable combination on $C_3$-$C_7$, 1-heptene with three methyl substituents in any stoichiometrically acceptable combination on $C_3$-$C_6$, 1-octene with an ethyl substituent on any of $C_3$-$C_7$, 1-hexene with two ethyl substituents in any stoichiometrically acceptable combination on $C_3$ or $C_4$, and 1-dodecene. It should be appreciated that the list of comonomers above is merely exemplary, and is not intended to be limiting. A particularly preferred comonomer is octene.

The ethylene alpha-olefin copolymer has the following characteristics:

(i) a molecular weight distribution $M_w/M_n$ ranging from a lower limit of 1.5 or 1.8 to an upper limit of 40 or 20 or 10 or 5 or 3;

(ii) a Composition Distribution Breadth Index (CDBI) greater than 50% or greater than 60% or greater than 65%;

(iii) a Melt Index Ratio $I_{10}/I_2$ ranging from a lower limit of 7 or 8 to an upper limit of 9 or 10; and (iv) a Melt Index Ratio $I_{21}/I_2$ ranging from a lower limit of 20 or 25 or 30 to an upper limit of 40 or 45 or 50.

Examples of suitable ethylene alpha-olefins include several of the copolymers sold under the trademark EXACT and available from the ExxonMobil Chemical Co., Houston, Tex., as well as the ENGAGE polymers available from DuPont/Dow. Particular EXACT copolymers include EXACT 0201, EXACT 0201HS, EXACT 0203, EXACT 8201, EXACT 8203, EXACT 210, and EXACT 8210, to name but a few. Typical ethylene alpha-olefins will have a density of 0.86 or 0.88 to 0.91 or 0.92 g/cm$^3$; and a melt index $I_2$ of from a lower limit of 0.1 dg/min or 0.5 dg/min or 1.0 dg/min to an upper limit of 10 dg/min or 50 dg/min or 100 dg/min, consistent with the Melt Index Ratios described above.

The appropriate amount of alpha-olefin comonomer in the copolymer can be readily determined by one skilled in the art, based on the desired density of the copolymer.

In one embodiment, the ethylene alpha-olefin copolymer is present in the cable coating compound in an amount of from 10 to 90 percent by weight, based on the weight of the ethylene alpha-olefin diene elastomeric terpolymer and the ethylene alpha-olefin copolymer.

In another embodiment, the ethylene alpha-olefin copolymer is present in the cable coating compound in an amount greater than 30 percent by weight, based on the weight of the ethylene alpha-olefin diene elastomeric terpolymer and the ethylene alpha-olefin copolymer.

In another embodiment, the ethylene alpha-olefin copolymer is present in the cable coating compound in an amount of greater than 50 percent by weight, based on the weight of the ethylene alpha-olefin diene elastomeric terpolymer and the ethylene alpha-olefin copolymer.

Cable Coating Compounds

As a specific example, a power cable coating compound suitable for use as an insulator in a "medium voltage" electrical cable, i.e., for voltages up to about 35 kV, can be formulated as shown in Table 1.

TABLE 1

CONVENTIONAL MEDIUM VOLTAGE CABLE COMPOUND

| Ingredient | Description | Formulation (phr)* |
|---|---|---|
| Polymer | EPDM | 100 |
| TRANSLIINK 37 | Surface-treated calcined clay | 60 |
| DRIMIX A172 | Vinyl silane | 1.0 |
| ERD 90 | Red Lead | 5.0 |
| AGERLITE MA | Antioxidant | 1.5 |
| ESCORENE LD400 | Low density polyethylene | 5.0 |
| Paraffin 1236 | Wax | 5.0 |
| Zinc Oxide | Zinc Oxide | 5.0 |
| DiCup 40KE | Dicumyl Peroxide (40% active) | 6.5 |

*parts by weight, based on 100 parts by weight polymer

All of the components listed in Table 1 are readily available from various commercial sources. The leftmost column of Table 1 indicates tradenames and/or typical suppliers of these components. TRANSLINK 37 is available from Englehard, Iselin, N.J. DRIMIX A172 is available from Kenrich Petrochemicals, Bayonne, N.J. ERD 90 is available from Rhein Chemie Corp, Trenton N.J. AGERLITE MA is available from R.T. Vanderbilt Co., Norwalk, Conn. ESCORENE LD400 is available from ExxonMobil Chemical Co., Houston, Tex. Paraffin 1236 is available from C.P. Hall Co., Chicago, Ill. DICUP 40KE is available from Hercules, Inc., Wilmington Del.

Preferably, the medium voltage cable compound is one which further meets the Insulated Cable Engineers Association (ICEA) specifications for medium voltage compounds. These specifications include:

Electrical properties: dielectric constant of less than 4.0, and dissipation factor of less than 0.015 (ASTM D150-98);

Physical properties: tensile strength greater than 8.2 MPa, and elongation to break greater than 250% (ASTM D412-92);

Heat aging properties: greater than 80% tensile retention and greater than 80% elongation retention after aging for 14 days at 121° C. (ExxonMobil Chemical Co. test procedure); and No gels: an absence of gelation regions in excess of 0.254 mm (ExxonMobil Chemical Co. test procedure).

It has been surprisingly found that cable coating compounds having superior processing and other characteristics can be formed using a polymer component that includes an ethylene alpha-olefin diene terpolymer and an ethylene alpha-olefin copolymer, the ethylene alpha-olefin copolymer having a Melt Index Ratio $I_{10}/I_2$ of at least 7.

Compounds can be formed using conventional mixing and extrusion techniques, as illustrated in the Examples herein.

Extruded Compounds

The cable coating compounds can be processed using conventional mixing and extruding techniques. It is desirable to extrude the compounds at relatively high extrusion rates, while still maintaining a smooth extrusion surface. It has been surprisingly found that the compounds of the present invention maintain excellent processability, as characterized by relatively low surface roughness.

Surface roughness can be measured as described in the Examples below, to obtain a surface profile, i.e., a two-dimensional cross-section of the surface. Imperfections appear as ridges or "shark skin" on the extruded strands. The surface profile includes a mean extrudate surface line, and positive and negative vertical deviations from the mean surface line. The surface roughness is quantified using a combination of two factors:

(1) Ra, the mean absolute vertical deviation from the mean extrudate surface line, in microns (µm); and (2) Rt, the absolute vertical difference between the maximum positive vertical deviation from the mean extrudate surface line and the maximum negative vertical deviation from the mean extrudate surface line, in microns (µm).

The Roughness Factor (R) is defined as:

$$R=Ra+0.1Rt$$

and incorporates both the Ra and Rt terms. Rt is given a lower weighting to adjust for its magnitude relative to Ra. R is dependent upon the extrusion rate and temperature.

Extruded compounds of the present invention can be characterized by the surface roughness factor R. Measured at an extrusion rate of 100 rpm and a temperature of 125° C., extruded compounds have a surface roughness factor R ranging from an upper limit of 20 µm or 15 µm or 10 µm to a lower limit of 5 µm or 3 µm or 1 µm or 0.

In another embodiment, the present invention is directed to an electrically conductive device, the device including an electrically conductive portion, and an electrically insulating portion. The electrically insulating portion includes a coating compound, which can be any of the coating compounds described herein. Suitable devices include any device having electrically conductive or semi-conductive and electrically insulative portions. A preferred, non-limiting example of such a device is an electrical cable.

Certain features and advantages of embodiments of the invention are illustrated by the following, non-limiting examples.

6. EXAMPLES

Materials

Certain characteristics of the EP(D)M and ethylene alpha olefin polymers used in the Examples herein are shown in Tables 2 and 3, respectively. Three commercial grades of EP(D)M are shown in Table 2: VISTALON™ 1703P, NORDEL™ 2722 and VISTALON™ 8731. These products are ethylene propylene diene terpolymers made with vinyl norbornene ("VNB"), 1,4-hexadiene ("HEX") and ethylidene norbornene ("ENB"), respectively, and are also denoted in this description as EP(D)M-VNB, EP(D)M-HEX and EP(D)M-ENB, respectively. All of these EP(D)M grades are made with conventional Ziegler-Natta catalysts and have been applied in commercial in wire and cable applications. VISTALON™ 1703P and VISTALON™ 8731 are commercially available from ExxonMobil Chemical Co., Houston, Tex.; NORDEL™ 2722 is commercially available from DuPont Dow Elastomers. It should be appreciated that these EPDM materials are merely exemplary, and numerous other EPDMs can be used in the embodiments described herein.

Two commercial ethylene alpha olefin copolymers having similar melt index (MI) and density are used in the Examples herein: EXACT™ 4033, containing butene as comonomer ("EB") and EXACT™ 8201, containing octene as comonomer ("EO"). These polymers have similar characteristics to the EP(D)M grades typically used in medium voltage insulation, low density and low MI. These attributes translate into good flexibility and sufficient melt strength to limit sagging during cable extrusion process. Both grades are made with a single-site metallocene catalyst and therefore have narrow molecular weight distribution and compositional distribution. EXACT polymers are available from ExxonMobil Chemical Co., Houston, Tex.

TABLE 2

EP(D)M CHARACTERISTICS

| Polymer | VISTALON™ 1703P | VISTALON™ 8731 | NORDEL™ 2722 |
|---|---|---|---|
| Diene | Vinyl norbornene | Ethylidine norbornene | 1,4-hexadiene |
| Diene structure | (norbornene with C=CH$_2$) | (norbornene with C—CH$_3$) | C=C—C—C=C—C |
| Mooney Viscosity (1 + 4) @ 125° C. | 25 | 26 | 26 |
| Ethylene (wt %) | 77 | 76 | 76 |
| Diene (wt %) | 0.9 | 3.3 | 4.0 |
| Mn (g/mol) | 36000 | 35000 | 39000 |
| Mw/Mn | 29.9 | 6.0 | 3.6 |
| Branching Index | 0.1 | 0.35 | 0.62 |

TABLE 3

ETHYLENE ALPHA-OLEFIN CHARACTERISTICS

| Polymer | EXACT™ 4033 | EXACT™ 8201 |
|---|---|---|
| Comonomer | 1-butene | 1-octene |
| Mooney Viscosity (1 + 4) @ 125° C. | 28 | 17 |
| Melt Index (g/10 min) | 0.8 | 1.1 |
| Comonomer mol % | 12.4 | 8.9 |
| Density (g/cm$^3$) | 0.880 | 0.882 |
| Crystallinity (%) | 19 | 19 |
| Mn (g/mol) | 54000 | 45000 |
| Mw/Mn | 2.2 | 2.4 |
| Melt Index Ratio $I_{10}/I_2$ | 5.6 | 8.3 |
| Melt Index Ratio $I_{21}/I_2$ | 17 | 35 |

Polymer Characterization

Polymer molecular weights are measured from gel permeation chromatography (GPC) using a differential refractive index detector (DRI) or a low angle laser light scattering (LALLS) detector. Lower moments of the molecular weight distribution, such as number average molecular weight ($M_n$) are obtained using a DRI. Higher moments, such as weight average molecular weight (Mw) and Z average molecular weight (Mz) are obtained from light scattering.

For plastomers, the melt index ratio (MIR) is commonly used to assess the degree of branching. Melt Index Ratio is defined as the ratio of the melt flow rates measured at two different pressures, i.e., with two different load conditions. Conventionally, the lower pressure measurement is made with a load of 2.16 kg and denoted $I_2$ (sometimes referred to as "melt index"), and the higher pressure measurement is made with a load of either 10 kg and denoted $I_{10}$, or a load of 21.6 kg and denoted $I_{21}$. The MIR is thus expressed as either a ratio $I_{21}/I_2$ or $I_{10}/I_2$. A higher MIR reflects more shear thinning and is generally indicative of enhanced processibility. MIR values reported herein are nominal values reported by the manufacturer. Methods of determining $I_2$, $I_{10}$ and $I_{21}$ are generally known and can be found in ASTM 1238.

Polymer viscoelastic properties were obtained using a Rubber Process Analyzer (RPA) 2000 instrument from Alpha Technologies. The measurements were made at 125° C., a constant strain of 14% (1 degree arc), and an oscillating shear rate range from 0.21 to 209 s$^{-1}$. The elastic modulus (G'), the loss modulus (G") and the complex viscosity ($\eta$*) were measured at varying shear rates.

Mooney viscosity was measured in accordance with ASTM D1646-99, and is reported in Mooney units.

Cure characteristics ($M_L$, $M_H$, Ts2, Tc90, cure state ($M_H$-$M_L$) and cure rate) were measured in accordance with ASTM D 2084-95, and are reported in the following units: $M_L$, dNm; $M_H$, dNm; Ts2, min; Tc90, min; cure state, dNm; and cure rate, dNm/min.

Hardness was measured in accordance with ASTM D 2240-91 and is reported in units of Shore A.

100% Modulus was measured in accordance with ASTM D 412-92 and is reported in units of MPa.

Tensile strength was measured in accordance with ASTM D 412-92 and is reported in units of MPa.

Elongation was measured in accordance with ASTM D 412-92 and is reported in units of percent (%).

Heat aged elongation was measured after 14 days aging at 150° C. and is reported in units of percent retention.

Dissipation Factor was measured in accordance with ASTM D 150-98, with the samples aged in 90° C. water, and using a 600 V alternating current source at 60 s$^{-1}$, and is reported in units of percent (%).

Dielectric constant was measured in accordance with ASTM D 150-98, with the samples aged in 90° C. water, and using a 600 V alternating current source at 60 s$^{-1}$, and is dimensionless.

Composition Distribution Breadth Index (CDBI) provides a measure of composition distribution. The definition of Composition Distribution Breadth Index (CDBI), and the method of determining CDBI, can be found in U.S. Pat. No. 5,206,075 and PCT publication WO 93/03093. From the weight fraction versus composition distribution curve, the CDBI is determined by establishing the weight percentage of a sample that has a comonomer content within 50% of the median comonomer content on each side of the median. The CDBI of a copolymer is readily determined utilizing well known techniques for isolating individual fractions of a sample of the copolymer. One such technique is Temperature Rising Elution Fractionation (TREF) as described in Wild, et al., *J. Poly. Sci., Poly. Phys. Ed.*, vol. 20, p. 441 (1982).

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is converted to a weight fraction versus composition distribution curve. For the purpose of simplifying the correlation of composition with elution temperature, all fractions are assumed to have a Mn≧15,000, where Mn is the number average molecular weight of the fraction. Any low weight fractions present generally represent a trivial portion of the copolymers. The remainder of this description and the appended claims maintain this convention of assuming all fractions have Mn≧15,000 in the CDBI measurement.

Compounds as described below were mixed in a 1600 cm³ Banbury mixer using a volumetric fill factor of 75%. The density of the compounds ranged from 1.04 to 1.23 g/cm³ depending on the proportion of EP(D)M, plastomer and filler in the formulation. A conventional mixing procedure (polymer first followed by clay and additive ingredients) was used as follows shown in Table 4.

TABLE 4

MIXING PROCEDURE

| Time (minutes) | Rotor Speed (RPM) | Action |
| --- | --- | --- |
| 0 | 85 | add: polymer, antioxidant |
| 0.5 | 85 | add: ½ clay, zinc oxide, red lead, ½ vinyl silane, LDPE |
| 2.0 | 100 | add: ¼ clay, ¼ vinyl silane, ½ paraffin wax |
| 3.0 | 100 | add: ¼ clay, ¼ vinyl silane, ½ paraffin wax |
| 4.0 | 100 | Sweep |
| 5.5 | 100 | Sweep |
| 7.0 | | Dump |

The total mixing time was seven minutes. The clay was added in three stages at different time intervals for effective incorporation. The dump temperature of the compounds was typically 120° C. The compounds discharged from the Banbury mixer were sheeted out in a two roll mill. The peroxide curatives were added on the mill and ingested into the compound. The compounds were press cured for 20 minutes at 165° C.

Compound processability assessments were conducted on a Haake RHEOCORD™ 90 extruder. The length to diameter (L/D) of the extruder screw for this extruder is 20/1, the compression ratio of the extruder screw is 2/1. A constricted die with a land length of 0.059" (1.5 mm) and diameter of 0.069" (1.75 mm) was selected for extrudate analysis. The extrusion temperature is maintained in the range of 110 to 125° C. Extrusion was performed over a range of screw speeds, varying from 25 to 100 rpm. Samples are obtained after the torque and the pressure drop equilibrated to a steady value at a constant screw speed.

The smoothness of the extrudates was analyzed using a Mitutoyo SURFTES™ SV-500 surface characterizing instrument. The instrument is equipped with a diamond stylus that moves over the surface of the extrudate under examination and records a surface profile, i.e., a two-dimensional cross-section of the surface along the path of travel of the stylus. The surface profile is analyzed as described above to obtain a surface roughness factor R.

Examples 1-10

Table 5 shows the cure characteristics and physical properties of compounds containing combinations of EP(D)M-VNB elastomers (VISTALON™ 1709P, described above) with an ethylene alpha-olefin polymer, EXACT™ 8201. Example 2 is a comparative example without the addition of an ethylene alpha-olefin polymer. Example 1 is a comparative example showing a typical commercial formulation using an EP(D)M-HEX EP(D)M and no ethylene alpha-olefin; such formulations are available commercially as SUPEROHM™ 3728 type compounds. Example 10 is a control having no EP(D)M polymer. Each Example is a compound formulated as in Table 1, except that the EP(D)M of Table 1 has been replaced with the polymer mixture as shown in Table 5. Note that control or comparative example numbers are denoted by a "C".

From the data in the Tables, it is evident that the addition of EXACT™ 8201 polymer to the ethylene alpha-olefin diene terpolymer improves the compound tensile strength. The tensile strength is enhanced from 11.9 MPa to 14.8 MPa with the addition of 20 to 80 parts per hundred (phr) of EXACT™ 8201. Similarly, the elongation to break is improved 270% to 440% with the addition of 20 to 80 phr of EXACT™ 8201.

TABLE 5

Cure and Physical Properties

| | EXAMPLE | | | | | | | | | |
|---|---|---|---|---|---|---|---|---|---|---|
| | 1C | 2C | 3 | 4 | 5 | 6 | 7 | 8 | 9 | 10C |
| EP(D)M-VNB (phr) | | 100 | 80 | 70 | 60 | 50 | 40 | 30 | 20 | 0 |
| EXACT ™ 8201 (phr) | | | 20 | 30 | 40 | 50 | 60 | 70 | 80 | 100 |
| EP(D)M-HEX (phr) | 100 | | | | | | | | | |
| Cure Characteristics | | | | | | | | | | |
| Mooney Scorch | | | | | | | | | | |
| Ms (t3) 132° C. (min) | 24 | 18 | 22 | 23 | 21 | 20 | 20 | 20 | 22 | 23 |
| Minimum Viscosity | 15 | 10 | 13 | 13 | 13 | 12 | 13 | 13 | 13 | 11 |
| ODR - 200° C., 3° Arc | | | | | | | | | | |
| ML (dN · m) | 8 | 6 | 7 | 7 | 8 | 8 | 8 | 8 | 8 | 7 |
| MH (dN · m) | 98 | 89 | 84 | 81 | 80 | 79 | 78 | 77 | 76 | 66 |
| ts2 (min) | 0.7 | 0.6 | 0.6 | 0.7 | 0.7 | 0.6 | 0.6 | 0.6 | 0.7 | 0.6 |
| t90 (min) | 2.0 | 1.7 | 1.8 | 1.9 | 1.9 | 1.9 | 1.9 | 1.9 | 2.0 | 2.0 |
| Cure Rate (dN · m/min) | 96 | 110 | 85 | 79 | 73 | 70 | 68 | 64 | 60 | 48 |
| MH-ML (dN · m) | 90 | 85 | 77 | 75 | 72 | 71 | 71 | 70 | 68 | 59 |
| Physical Properties | | | | | | | | | | |
| cured 20 min, 165° C. | | | | | | | | | | |
| Hardness (Shore A) | 84 | 89 | 90 | 91 | 92 | 91 | 92 | 92 | 93 | 92 |
| 100% Modulus (MPa) | 6.1 | 6.5 | 7.1 | 7.5 | 7.5 | 7.7 | 8.1 | 8.4 | 8.6 | 8.6 |
| 200% Modulus (MPa) | 10.1 | 10.4 | 10.8 | 11.3 | 11.0 | 11.2 | 11.5 | 11.9 | 12.0 | 11.9 |
| 300% Modulus (MPa) | 11.9 | — | 12.5 | 13.1 | 12.6 | 13.0 | 13.0 | 13.5 | 13.7 | 13.5 |
| Tensile Strength (MPa) | 11.9 | 11.9 | 12.5 | 13.4 | 13.5 | 13.7 | 13.8 | 14.4 | 14.8 | 15.2 |
| Elongation (%) | 310 | 270 | 320 | 320 | 370 | 390 | 400 | 400 | 440 | 520 |

Table 6 shows the extrusion properties of the compounds in Table 5. Examples 3 through 6 are smoother or as smooth as Example 2 (comparative) at 100 rpm. Examples 7 and 8 are smoother than Example 1 (comparative).

Table 7 shows the electrical properties, including dissipation factor, dielectric constant and breakdown strength, of the compounds in Table 5.

TABLE 6

Processing Characteristics

| | EXAMPLE | | | | | | | | | |
|---|---|---|---|---|---|---|---|---|---|---|
| | 1C | 2C | 3 | 4 | 5 | 6 | 7 | 8 | 9 | 10C |
| EP(D)M-VNB (phr) | | 100 | 80 | 70 | 60 | 50 | 40 | 30 | 20 | |
| EXACT ™ 8201 (phr) | | | 20 | 30 | 40 | 50 | 60 | 70 | 80 | 100 |
| EP(D)M-HEX (phr) | 100 | | | | | | | | | |
| Processing Attributes | | | | | | | | | | |
| Surface Roughness (Ra) | | | | | | | | | | |
| (µm at rpm) | | | | | | | | | | |
| 25 rpm | 9 | 3 | 4 | 4 | 4 | 5 | — | 5 | 6 | 29 |
| 50 rpm | 7 | 5 | 3 | 3 | 3 | 5 | 5 | 5 | 6 | 12 |
| 75 rpm | 7 | 4 | 3 | 3 | 3 | 4 | 4 | 5 | 5 | 11 |
| 100 rpm | 7 | 4 | 2 | 3 | 3 | 4 | 5 | 5 | 8 | 26 |
| Surface Roughness (Rt) | | | | | | | | | | |
| (µm at rpm) | | | | | | | | | | |
| 25 rpm | — | 24 | 33 | 31 | 33 | 40 | — | 44 | 44 | 142 |
| 50 rpm | 55 | | 22 | 26 | 27 | 41 | 35 | 39 | 53 | 105 |
| 75 rpm | 52 | 27 | 30 | 26 | 29 | 34 | 32 | 53 | 56 | 116 |
| 100 rpm | 60 | 33 | 23 | 20 | 28 | 33 | 43 | 43 | 66 | 167 |
| Roughness Factor (R) | | | | | | | | | | |
| (µm at rpm) | | | | | | | | | | |
| 100 rpm | 13 | 7 | 4 | 5 | 6 | 7 | 9 | 9 | 15 | 20 |
| Extrusion Mass Rate | | | | | | | | | | |
| (g/min at rpm) | | | | | | | | | | |
| 25 rpm | 49 | 46 | 43 | 38 | 50 | 47 | 47 | 49 | 44 | 41 |
| 50 rpm | 107 | 102 | 104 | 105 | 105 | 103 | 99 | 104 | 89 | 87 |
| 75 rpm | 153 | 160 | 157 | 156 | 155 | 144 | 150 | 153 | 141 | 101 |
| 100 rpm | 196 | 203 | 198 | 207 | 203 | 185 | 184 | 200 | 175 | 87 |

TABLE 7

Electrical Performance

| | EXAMPLE | | | | | | | | | |
|---|---|---|---|---|---|---|---|---|---|---|
| | 1C | 2C | 3 | 4 | 5 | 6 | 7 | 8 | 9 | 10C |
| EP-VNB (phr) | | 100 | 80 | 70 | 60 | 50 | 40 | 30 | 20 | |
| EXACT™ 8201 (phr) | | | 20 | 30 | 40 | 50 | 60 | 70 | 80 | 100 |
| EP-HEX (phr) | 100 | | | | | | | | | |
| Dielectric Strength | | | | | | | | | | |
| (V/mil) | | 944 | | 923 | | 932 | | 933 | | 926 |
| (V/μm) | | 37.2 | | 36.3 | | 36.7 | | 36.7 | | 36.5 |
| Dissipation Factor (600 V, 60 Hz) (days in 90° C. water) | | | | | | | | | | |
| 0 days (dry) | 0.0025 | 0.0021 | 0.0022 | 0.0022 | 0.0023 | 0.0022 | 0.0024 | 0.0023 | 0.0025 | 0.0027 |
| 1 day | 0.0059 | 0.0042 | 0.0041 | 0.0041 | 0.0044 | 0.0040 | 0.0043 | 0.0042 | 0.0042 | 0.0045 |
| 7 days | 0.0048 | 0.0038 | 0.0036 | 0.0036 | 0.0042 | 0.0034 | 0.0037 | 0.0042 | 0.0042 | 0.0046 |
| 14 days | 0.0048 | 0.0042 | 0.0036 | 0.0039 | 0.0043 | 0.0037 | 0.0041 | 0.0042 | 0.0043 | 0.0049 |
| 21 days | 0.0048 | 0.0043 | 0.0037 | 0.0041 | 0.0044 | 0.0040 | 0.0042 | 0.0044 | 0.0045 | 0.0053 |
| 28 days | 0.0051 | 0.0044 | 0.0040 | 0.0045 | 0.0045 | 0.0040 | 0.0043 | 0.0044 | 0.0046 | 0.0055 |
| Dielectric Constant | | | | | | | | | | |
| 0 days (dry) | 2.64 | 2.57 | 2.59 | 2.59 | 2.60 | 2.48 | 2.62 | 2.57 | 2.56 | 2.52 |
| 1 day | 2.36 | 2.34 | 2.35 | 2.31 | 2.33 | 2.27 | 2.34 | 2.30 | 2.32 | 2.29 |
| 7 days | 2.39 | 2.35 | 2.36 | 2.32 | 2.33 | 2.27 | 2.34 | 2.30 | 2.32 | 2.30 |
| 14 days | 2.39 | 2.35 | 2.37 | 2.32 | 2.33 | 2.27 | 2.34 | 2.29 | 2.32 | 2.30 |
| 21 days | 2.40 | 2.35 | 2.37 | 2.33 | 2.34 | 2.28 | 2.35 | 2.30 | 2.33 | 2.30 |
| 28 days | 2.41 | 2.36 | 2.37 | 2.33 | 2.34 | 2.27 | 2.35 | 2.30 | 2.32 | 2.31 |

Examples 11-19 (Comparative)

Examples 11-19 are comparative examples showing the properties of cable coating compounds similar to those of discussed above, but using EXACT™ 4033 as the ethylene alpha-olefin. As shown above, EXACT™ 4033 is a metallocene ethylene-butene copolymer, but with a Melt Index Ratio $I_{10}/I_2$ of 5.6 (i.e., less than the minimum of 7 for copolymers of the invention) and a Melt Index Ratio $I_{21}/I_2$ of 17 (i.e., less than the minimum of 20 for copolymers of the invention).

Compounds were prepared and tested as described for Examples 1-10. The data are summarized in Tables 8, 9 and 10. Comparative Examples 11 and 19 are control samples, with no ethylene alpha-olefin and no ethylene alpha-olefin diene, respectively.

TABLE 8

COMPARATIVE EXAMPLES, CURE AND PHYSICAL PROPERTIES

| | EXAMPLE | | | | | | | | |
|---|---|---|---|---|---|---|---|---|---|
| | 11 | 12 | 13 | 14 | 15 | 16 | 17 | 18 | 19 |
| EP(D)M-VNB (phr) | 100 | 80 | 70 | 60 | 50 | 40 | 30 | 20 | |
| EXACT™ 4033 (phr) | | 20 | 30 | 40 | 50 | 60 | 70 | 80 | 100 |
| Cure Characteristics | | | | | | | | | |
| Mooney Scorch | | | | | | | | | |
| Ms (t3) 132° C. (min) | 17.3 | 16.8 | 17.9 | 15.5 | 17.7 | 10.8 | 10.0 | 10.2 | 9.7 |
| Minimum Viscosity | 12.3 | 17.5 | 20.2 | 21.4 | 23.1 | 21.6 | 21.1 | 20.5 | 15.5 |
| ODR-200° C., 3° arc | | | | | | | | | |
| ML (dN · m) | 6 | 10 | 11 | 12 | 13 | 13 | 12 | 12 | 10 |
| MH (dN · m) | 95 | 94 | 90 | 101 | 94 | 100 | 98 | 101 | 95 |
| ts2 (min) | 0.6 | 0.6 | 0.6 | 0.6 | 0.6 | 0.6 | 0.6 | 0.5 | 0.6 |
| t90 (min) | 1.7 | 1.8 | 1.8 | 1.8 | 1.8 | 1.9 | 1.8 | 1.7 | 1.9 |
| t98 | 2.2 | 2.3 | 2.3 | 2.3 | 2.3 | 2.3 | 2.3 | 2.2 | 2.4 |
| Cure Rate (dN · m/min) | 118 | 99 | 82 | 97 | 83 | 91 | 88 | 90 | 73 |
| MH-ML (dN · m) | 88 | 84 | 79 | 89 | 81 | 88 | 85 | 89 | 85 |
| Physical Properties cured 20 min, 165° C. | | | | | | | | | |
| Hardness (Shore A) | 90 | 91 | 91 | 91 | 92 | 93 | 92 | 94 | 94 |
| 100% Modulus (MPa) | 6.3 | 6.7 | 5.6 | 7.9 | 6.6 | 6.7 | 8.0 | 8.1 | 7.8 |
| 200% Modulus (MPa) | 9.5 | 10.0 | 8.4 | 11.4 | 9.9 | 10.1 | 11.6 | 11.8 | 11.3 |
| 300% Modulus (MPa) | — | — | 10.5 | — | 11.7 | 12.2 | 13.3 | 13.8 | 13.1 |
| Tensile Strength (MPa) | 9.5 | 11.2 | 11.9 | 12.7 | 12.5 | 11.8 | 13.9 | 14.5 | 14.7 |
| Elongation (%) | 226 | 277 | 382 | 272 | 363 | 331 | 366 | 378 | 471 |

TABLE 9

COMPARATIVE EXAMPLES, PROCESSING CHARACTERISTICS EXAMPLE

| | 11 | 12 | 13 | 14 | 15 | 16 | 17 | 18 | 19 |
|---|---|---|---|---|---|---|---|---|---|
| EP(D)M-VNB (phr) | 100 | 80 | 70 | 60 | 50 | 40 | 30 | 20 | |
| EXACT™ 4033 (phr) | | 20 | 30 | 40 | 50 | 60 | 70 | 80 | 100 |
| Processing Attributes Surface Roughness (Ra) (μm at rpm) | | | | | | | | | |
| 25 rpm | 2 | 6 | — | — | 21 | 26 | — | — | — |
| 50 rpm | 2.5 | 5.4 | — | — | 22.4 | 19.3 | — | — | — |
| 75 rpm | — | 7.4 | — | — | 19.9 | 28.5 | — | — | — |
| 100 rpm | 2.9 | 6.8 | — | — | 18.8 | 37.4 | — | — | — |
| Surface Roughness (Rt) (μm at rpm) | | | | | | | | | |
| 25 rpm | 14 | 44 | — | — | 155 | 180 | — | — | — |
| 50 rpm | 23 | 38 | — | — | 140 | 157 | — | — | — |
| 75 rpm | — | 62 | — | — | 135 | 258 | — | — | — |
| 100 rpm | 22 | 48 | — | — | 138 | 248 | — | — | — |
| Roughness Factor (R) (μm at rpm) | | | | | | | | | |
| 100 rpm | | 5.1 | 12 | | 33 | 62 | | | |

TABLE 10

COMPARATIVE EXAMPLES, ELECTRICAL PERFORMANCE

| | EXAMPLE | | | | | | | | |
|---|---|---|---|---|---|---|---|---|---|
| | 11 | 12 | 13 | 14 | 15 | 16 | 17 | 18 | 19 |
| EP(D)M-VNB (phr) | 100 | 80 | 70 | 60 | 50 | 40 | 30 | 20 | |
| EXACT™ 4033 (phr) | | 20 | 30 | 40 | 50 | 60 | 70 | 80 | 100 |
| Electrical Properties Dissipation Factor (600 V, 60 Hz) (days in 90° C. water) | | | | | | | | | |
| 0 days (dry) | 0.0044 | 0.0036 | 0.0027 | 0.0037 | 0.0037 | 0.0034 | 0.0034 | 0.0038 | 0.0037 |
| 1 day | 0.0063 | 0.0065 | 0.0061 | 0.0079 | 0.0079 | 0.0070 | 0.0072 | 0.0075 | 0.0077 |
| 7 days | 0.0062 | 0.0064 | 0.0058 | 0.0076 | 0.0072 | 0.0062 | 0.0067 | 0.0071 | 0.0072 |
| 14 days | 0.0059 | 0.0059 | 0.0059 | 0.0073 | 0.0070 | 0.0060 | 0.0066 | 0.0069 | 0.0070 |
| Dielectric Constant | | | | | | | | | |
| 0 days (dry) | 2.48 | 2.60 | 2.51 | 2.62 | 2.63 | 2.62 | 2.59 | 2.64 | 2.57 |
| 1 day | 2.34 | 2.38 | 2.31 | 2.44 | 2.46 | 2.41 | 2.33 | 2.42 | 2.40 |
| 7 days | 2.34 | 2.38 | 2.32 | 2.46 | 2.48 | 2.41 | 2.34 | 2.40 | 2.38 |
| 14 days | 2.35 | 2.38 | 2.31 | 2.45 | 2.48 | 2.42 | 2.35 | 2.41 | 2.40 |

Examples 20-33

Examples 20-33 show several properties of compounds prepared and formulated as described above, except that the amount of clay in the compound is varied. Table 11 summarizes the compounds used. Note that the amounts of EP(D)M-VNB, EXACT™ 8201 and clay are in units of parts by weight, based on a total of 160 parts of these three components. The remaining components (Table 1) are unchanged in relative proportions. Note that Examples 20, 27 and 28 are controls, and are marked with a "C".

TABLE 11

| Example # | EP(D)M-VNB | EXACT™ 8201 | Calcined Treated Clay |
|---|---|---|---|
| 20C | 0 | 95 | 65 |
| 21 | 30 | 100 | 30 |
| 22 | 45 | 45 | 70 |
| 23 | 30 | 100 | 30 |
| 24 | 65 | 65 | 30 |
| 25 | 0 | 95 | 65 |
| 26 | 77 | 27 | 57 |
| 27C | 100 | 0 | 60 |
| 28C | 100 | 0 | 60 |
| 29 | 45 | 45 | 70 |
| 30 | 27 | 77 | 57 |
| 31 | 53 | 53 | 53 |
| 32 | 100 | 15 | 45 |
| 33 | 100 | 30 | 30 |

Table 12 summarizes several properties of the compounds shown in Table 11.

TABLE 12

| Example # | CureRate (dN·m/min) | Cure State (dN·m) | Hardness (Shore A) | 100% Modulus (MPa) | Tensile Strength (MPa) | Elongation (%) | Ra (μm at 100 rpm) | Rt (μm at 100 rpm) | R (μm at 100 rpm) |
|---|---|---|---|---|---|---|---|---|---|
| 20C | 66 | 70 | 92 | 9.6 | 16.7 | 400 | 19 | 143 | 23 |
| 21 | 52 | 58 | 89 | 5.6 | 17.8 | 540 | 8 | 64 | 14 |
| 22 | 97 | 87 | 91 | 10.1 | 15.7 | 250 | 4 | 43 | 8 |
| 23 | 47 | 53 | 88 | 5.4 | 15.6 | 540 | 8 | 64 | 14 |
| 24 | 59 | 59 | 88 | 4.6 | 13.7 | 450 | 5 | 47 | 10 |
| 25 | 60 | 69 | 92 | 9.3 | 16.4 | 350 | 19 | 143 | 23 |
| 26 | 99 | 82 | 90 | 6.9 | 13.2 | 290 | 3 | 21 | 5 |
| 27C | 123 | 92 | 88 | 6.6 | 11.7 | 220 | 6 | 45 | 11 |
| 28C | 121 | 90 | 88 | 6.6 | 12.1 | 240 | 6 | 45 | 11 |
| 29 | 99 | 87 | 91 | 9.7 | 15.3 | 260 | 4 | 43 | 8 |
| 30 | 68 | 69 | 91 | 8.1 | 15.9 | 360 | 4 | 34 | 7 |
| 31 | 77 | 72 | 90 | 6.6 | 14.1 | 350 | 4 | 37 | 8 |
| 32 | 94 | 76 | 88 | 5.3 | 12.2 | 320 | 3 | 29 | 6 |
| 33 | 72 | 64 | 86 | 4.3 | 11.4 | 380 | 3 | 27 | 6 |

Certain features of the present invention are described in terms of a set of numerical upper limits and a set of numerical lower limits. It should be appreciated that ranges from any lower limit to any upper limit are within the scope of the invention unless otherwise indicated.

All patents, test procedures, and other documents cited in this application are fully incorporated by reference to the extent such disclosure is not inconsistent with this application and for all jurisdictions in which such incorporation is permitted.

What is claimed is:

1. A power cable coating compound consisting of:
   a) an elastomeric component consisting of:
      1) an ethylene alpha-olefin vinyl norbornene elastomeric terpolymer; and
      2) an ethylene alpha-olefin copolymer having a Melt Index Ratio of $I_{10}/I_2$ of a least 7, wherein the ethylene alpha-olefin copolymer comprises a copolymer of ethylene and 1-octene,
      wherein the ethylene alpha-olefin copolymer is present in the coating compound in an amount greater than 50 percent by weight, based on the weight of the ethylene alpha-olefin vinyl norbornene elastomeric terpolymer and the ethylene alpha-olefin copolymer, and wherein the coating compound has a 14-day dissipation factor (600V, 60 Hz, 90° C. water) of less than or equal to about 0.0049; and
   b) one or more fillers or additives selected from the group consisting of a clay, vinyl silane, lead, antioxidant, low density polypropylene, wax, zinc oxide, peroxide, and combinations thereof.

2. The coating compound of claim 1, wherein the ethylene alpha-olefin copolymer has a Melt Index Ratio $I_{10}/I_2$ of from 7 to 10.

3. The coating compound of claim 1, wherein the ethylene alpha-olefin copolymer has a Melt Index Ratio $I_{10}/I_2$ of from 8 to 10.

4. The coating compound of claim 1, wherein the ethylene alpha-olefin copolymer has a Melt Index Ratio $I_{21}/I_2$ of at least 20.

5. The coating compound of claim 1, wherein the ethylene alpha-olefin copolymer has a Melt Index Ratio $I_{21}/I_2$ of from 25 to 50.

6. The coating compound of claim 1, wherein the ethylene alpha-olefin copolymer has a Melt Index Ratio $I_{21}/I_2$ of from 30-40.

7. The coating compound of claim 1, wherein the ethylene alpha-olefin copolymer is present in the coating compound in an amount of about 60 percent by weight, based on the weight of the ethylene alpha-olefin vinyl norbornene elastomeric terpolymer and the ethylene alpha-olefin copolymer.

8. The coating compound of claim 1, wherein the ethylene alpha-olefin copolymer is present in the coating compound in an amount of about 80 percent by weight, based on the weight of the ethylene alpha-olefin vinyl norbornene elastomeric terpolymer and the ethylene alpha-olefin copolymer.

9. The coating compound of claim 1, wherein the ethylene alpha-olefin copolymer has a molecular weight distribution Mw/Mn less than 10.

10. The coating compound of claim 1, wherein the ethylene alpha-olefin copolymer has a molecular weight distribution Mw/Mn less than 5.

11. The coating compound of claim 1, wherein the ethylene alpha-olefin copolymer has a molecular weight distribution Mw/Mn less than 3.

12. The coating compound of claim 1, wherein the ethylene alpha-olefin vinyl norbornene elastomeric terpolymer has a branching index of less than 1.0.

13. The coating compound of claim 1, wherein the ethylene alpha-olefin vinyl norbornene elastomeric terpolymer has a branching index of less than 0.7.

14. The coating compound of claim 1, wherein the ethylene alpha-olefin vinyl norbornene elastomeric terpolymer has a branching index of less than 0.5.

15. The coating compound of claim 1, wherein the ethylene alpha-olefin vinyl norbornene elastomeric terpolymer has a molecular weight distribution Mw/Mn greater than 3.

16. The coating compound of claim 1, wherein the ethylene alpha-olefin vinyl norbornene elastomeric terpolymer has a molecular weight distribution Mw/Mn greater than 10.

17. The coating compound of claim 1, wherein the ethylene alpha-olefin vinyl norbornene elastomeric terpolymer has from 50 to 90 mol % ethylene-derived units and from 0.1 to 1.5 mol % diene-derived units.

18. A power cable coating compound consisting of:
   a) an elastomeric component consisting of:
      1) an ethylene alpha-olefin diene elastomeric terpolymer having a branching index less than 1.0 and a molecular weight distribution Mw/Mn greater than 3; and
      2) an ethylene alpha-olefin copolymer having a Melt Index Ratio $I_{10}/I_2$ of at least 7 and a Melt Index Ratio $I_{21}/I_2$ of at least 20, wherein the ethylene alpha-olefin copolymer is present in the coating compound in an amount of greater than 50 percent by weight, based on the weight of the ethylene alpha-olefin diene elastomeric terpolymer and the ethylene alpha-olefin copolymer, and wherein the coating compound has a 14-day dissipation factor (600V, 60 Hz, 90° C. water) of less than or equal to about 0.0049; and b) one or more fillers or additives selected from the group consisting of a clay, vinyl silane, lead, antioxidant, low density polypropylene, wax, zinc oxide, peroxide, and combinations thereof.

19. The coating compound of claim 18, wherein the ethylene alpha-olefin copolymer has a Melt Index Ratio $I_{10}/I_2$ of from 7 to 10.

20. The coating compound of claim 18, wherein the ethylene alpha-olefin copolymer has a Melt Index Ratio $I_{10}/I_2$ of from 8 to 10.

21. The coating compound of claim 18, wherein the ethylene alpha-olefin copolymer has a Melt Index Ratio $I_{21}/I_2$ of from 25 to 50.

22. The coating compound of claim 18, wherein the ethylene alpha-olefin copolymer has a Melt Index Ratio $I_{21}/I_2$ of from 30-40.

23. The coating compound of claim 18, wherein the ethylene alpha-olefin copolymer is present in the coating compound in an amount of about 70 percent by weight, based on the weight of the ethylene alpha-olefin diene elastomeric terpolymer and the ethylene alpha-olefin copolymer.

24. The coating compound of claim 18, wherein the ethylene alpha-olefin copolymer is present in the coating compound in an amount of about 90 percent by weight, based on the weight of the ethylene alpha-olefin diene elastomeric terpolymer and the ethylene alpha-olefin copolymer.

25. The coating compound of claim 18, wherein the ethylene alpha-olefin copolymer has a molecular weight distribution Mw/Mn less than 10.

26. The coating compound of claim 18, wherein the ethylene alpha-olefin copolymer has a molecular weight distribution Mw/Mn less than 5.

27. The coating compound of claim 18, wherein the ethylene alpha-olefin copolymer has a molecular weight distribution Mw/Mn less than 3.

28. The coating compound of claim 18, wherein the ethylene alpha-olefin copolymer is a copolymer of ethylene and 1-octene.

29. The coating compound of claim 18, wherein the diene of the ethylene alpha-olefin elastomeric terpolymer is vinyl norbornene.

30. The coating compound of claim 18, wherein the ethylene alpha-olefin diene elastomeric terpolymer has a branching index of less than 0.7.

31. The coating compound of claim 18, wherein the ethylene alpha-olefin diene elastomeric terpolymer has a branching index of less than 0.5.

32. The coating compound of claim 18, wherein the ethylene alpha-olefin diene elastomeric terpolymer has a molecular weight distribution Mw/Mn greater than 10.

33. The coating compound of claim 18, wherein the ethylene alpha-olefin diene elastomeric terpolymer has from 50 to 90 mol % ethylene-derived units and from 0.1 to 1.5 mol % diene-derived units.

34. A power cable coating compound consisting of:
a) an elastomeric component consisting of:
1) an ethylene alpha-olefin vinyl norbornene elastomeric terpolymer having 50 to 90 mol % ethylene-derived units and from 0.1 to 1.5 mol % diene-derived units; and
2) an ethylene alpha-olefin copolymer having a Melt Index Ratio $I_{10}/I_2$ of from 7 to 10,
wherein the ethylene alpha-olefin copolymer is present in the coating compound in an amount greater than 50 percent by weight, based on the weight of the ethylene alpha-olefin vinyl norbornene elastomeric terpolymer and the ethylene alpha-olefin copolymer, and
wherein the coating compound has a 14-day dissipation factor (600V, 60 Hz, 90° C. water) of less than or equal to about 0.0049; and
b) one or more fillers or additives selected from the group consisting of a clay, vinyl silane, lead, antioxidant, low density polypropylene, wax, zinc oxide, peroxide, and combinations thereof.

35. A power cable coating compound consisting of:
a) an elastomeric component consisting of:
1) an ethylene alpha-olefin vinyl norbornene elastomeric terpolymer having a branching index less than 0.9 and a molecular weight distribution Mw/Mn greater than 3; and
2) an ethylene alpha-olefin copolymer having a density of 0.86 g/cm³ to 0.92 g/cm³, a Melt Index Ratio $I_{10}/I_2$ of from 7 to 10 and a Melt Index Ratio $I_{21}/I_2$ of at least 20,
wherein the ethylene alpha-olefin copolymer is present in the coating compound in an amount of greater than 50 percent by weight, based on the weight of the ethylene alpha-olefin vinyl norbornene elastomeric terpolymer and the ethylene alpha-olefin copolymer, and
wherein the coating compound has a 14-day dissipation factor (600V, 60 Hz, 90° C. water) of less than or equal to about 0.0049; and
b) one or more fillers or additives selected from the group consisting of a clay, vinyl silane, lead, antioxidant, low density polypropylene, wax, zinc oxide, peroxide, and combinations thereof.

36. An electrically conductive device comprising:
(a) an electrically conductive portion; and
(b) an electrically insulating portion consisting of:
(1) an elastomeric component consisting of:
(ii) an ethylene alpha-olefin diene elastomeric terpolymer; and
(ii) an ethylene alpha-olefin copolymer having a Melt Index Ratio $I_{10}/I_2$ of at least 7,
wherein the ethylene alpha-olefin copolymer is present in an amount greater than 50 percent by weight, based on the weight of the ethylene alpha-olefin diene elastomeric terpolymer and the ethylene alpha-olefin copolymer, and
wherein the insulating portion has a 14-day dissipation factor (600V, 60 Hz, 90° C. water) of less than or equal to about 0.0049; and
(2) one or more fillers or additives selected from the group consisting of a clay, vinyl silane, lead, antioxidant, low density polypropylene, wax, zinc oxide, peroxide, and combinations thereof.

37. The electrically conductive device of claim 36, wherein the electrically insulating portion is an extruded compound having an extrusion profile measured from a sample extruded at 100 rpm and 125° C., the extrusion profile having a plurality of positive and negative vertical deviations from a mean extrudate surface line, wherein the extruded compound has a surface roughness factor R of less than 20, where R is defined by $$R=Ra+0.1Rt,$$

Ra is the mean absolute vertical deviation from the mean extrudate surface line, and Rt is the absolute vertical difference between the maximum positive vertical deviation from the mean extrudate surface line and the maximum negative vertical deviation from the mean extrudate surface line.

38. The electrically conductive device of claim 37, wherein the surface roughness factor R is less than 15.

39. The electrically conductive device of claim 37, wherein the surface roughness factor R is less than 10.

40. The electrically conductive device of claim 37, wherein the device is a medium voltage power cable.

41. An electrically conductive device comprising:
(a) an electrically conductive portion; and
(b) an electrically insulating portion consisting of:
  (1) an elastomeric component consisting of:
    (i) an ethylene alpha-olefin diene elastomeric terpolymer having a branching index less than 1.0 and a molecular weight distribution Mw/Mn greater than 3; and
    (ii) an ethylene alpha-olefin copolymer having a Melt Index Ratio $I_{10}/I_2$ of at least 7 and a Melt Index Ratio $I_{21}/I_2$ of at least 20,
    wherein the ethylene alpha-olefin copolymer is present in an amount of greater than 50 percent by weight, based on the weight of the ethylene alpha-olefin diene elastomeric terpolymer and the ethylene alpha-olefin copolymer, and
    wherein the insulating portion has a 14-day dissipation factor (600V, 60 Hz, 90° C. water) of less than or equal to about 0.0049; and
  (2) one or more fillers or additives selected from the group consisting of a clay, vinyl silane, lead, antioxidant, low density polypropylene, wax, zinc oxide, peroxide, and combinations thereof.

42. The electrically conductive device of claim 41, wherein the electrically insulating portion is an extruded compound having an extrusion profile measured from a sample extruded at 100 rpm and 125° C., the extrusion profile having a plurality of positive and negative vertical deviations from a mean extrudate surface line, wherein the extruded compound has a surface roughness factor R of less than 20, where R is defined by $$R=Ra+0.1Rt,$$

Ra is the mean absolute vertical deviation from the mean extrudate surface line, and Rt is the absolute vertical difference between the maximum positive vertical deviation from the mean extrudate surface line and the maximum negative vertical deviation from the mean extrudate surface line.

43. The electrically conductive device of claim 42, wherein the surface roughness factor R is less than 15.

44. The electrically conductive device of claim 42, wherein the surface roughness factor R is less than 10.

45. The electrically conductive device of claim 42, wherein the device is a medium voltage power cable.

46. An electrically conductive device comprising:
(a) an electrically conductive portion; and
(b) an electrically insulating portion consisting of:
  (1) an elastomeric component consisting of:
    (i) an ethylene alpha-olefin vinyl norbornene elastomeric terpolymer; and
    (ii) an ethylene alpha-olefin copolymer having a Melt Index Ratio $I_{10}/I_2$ of at least 7,
    wherein the ethylene alpha-olefin copolymer is present in an amount greater than 50 percent by weight, based on the weight of the ethylene alpha-olefin vinyl norbornene elastomeric terpolymer and the ethylene alpha-olefin copolymer, and
    wherein the insulating portion has a 14-day dissipation factor (600V, 60 Hz, 90° C. water) of less than or equal to about 0.0049; and
  (2) one or more fillers or additives selected from the group consisting of a clay, vinyl silane, lead, antioxidant, low density polypropylene, wax, zinc oxide, peroxide, and combinations thereof.

47. The electrically conductive device of claim 46, wherein the electrically insulating portion is an extruded compound having an extrusion profile measured from a sample extruded at 100 rpm and 125° C., the extrusion profile having a plurality of positive and negative vertical deviations from a mean extrudate surface line, wherein the extruded compound has a surface roughness factor R of less than 20, where R is defined by $$R=Ra+0.1Rt,$$

Ra is the mean absolute vertical deviation from the mean extrudate surface line, and Rt is the absolute vertical difference between the maximum positive vertical deviation from the mean extrudate surface line and the maximum negative vertical deviation from the mean extrudate surface line.

48. The electrically conductive device of claim 47, wherein the surface roughness factor R is less than 15.

49. The electrically conductive device of claim 47, wherein the surface roughness factor R is less than 10.

50. The electrically conductive device of claim 47, wherein the device is a medium voltage power cable.

51. An electrically conductive device comprising:
(a) an electrically conductive portion; and
(b) an electrically insulating portion consisting of:
  (1) an elastomeric component consisting of:
    (i) an ethylene alpha-olefin vinyl norbornene elastomeric terpolymer having a branching index less than 1.0 and a molecular weight distribution Mw/Mn greater than 3; and
    (ii) an ethylene alpha-olefin copolymer having a Melt Index Ratio $I_{10}/I_2$ of at least 7 and a Melt Index Ratio $I_{21}/I_2$ of at least 20,
    wherein the ethylene alpha-olefin copolymer is present in an amount of greater than 50 percent by weight, based on the weight of the ethylene alpha-olefin vinyl norbornene elastomeric terpolymer and the ethylene alpha-olefin copolymer, and
    wherein the insulating portion has a 14-day dissipation factor (600V, 60 Hz, 90° C. water) of less than or equal to about 0.0049; and
  (2) one or more fillers or additives selected from the group consisting of a clay, vinyl silane, lead, antioxidant, low density polypropylene, wax, zinc oxide, peroxide, and combinations thereof.

52. The electrically conductive device of claim 51, wherein the electrically insulating portion is an extruded compound having an extrusion profile measured from a sample extruded at 100 rpm and 125° C., the extrusion profile having a plurality of positive and negative vertical deviations from a mean extrudate surface line, wherein the extruded compound has a surface roughness factor R of less than 20, where R is defined by $$R=Ra+0.1Rt,$$

Ra is the mean absolute vertical deviation from the mean extrudate surface line, and Rt is the absolute vertical difference between the maximum positive vertical deviation from the mean extrudate surface line and the maximum negative vertical deviation from the mean extrudate surface line.

53. The electrically conductive device of claim 52, wherein the surface roughness factor R is less than 15.

54. The electrically conductive device of claim 52, wherein the surface roughness factor R is less than 10.

55. The electrically conductive device of claim 52, wherein the device is a medium voltage power cable.

* * * * *